United States Patent Office.

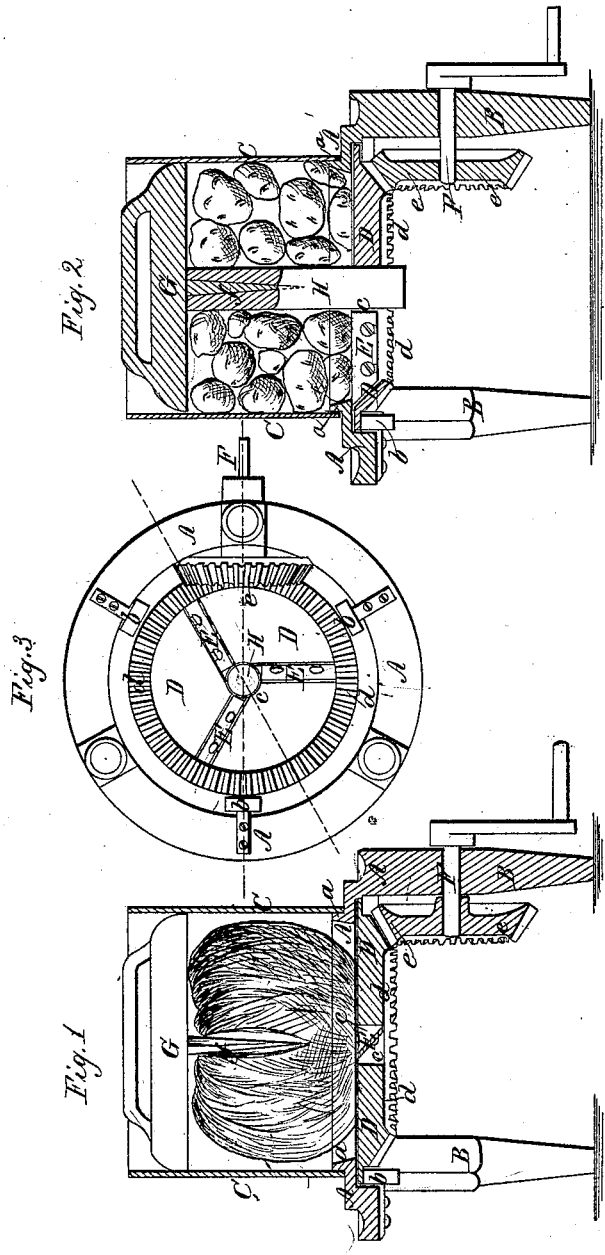
M. H. Chrysler,
Vegetable Cutter
No. 97,047. Patented Nov. 23, 1869.
Witnesses
John F. Brooks
E. Greene Collins
Inventor
M. H. Chrysler
per Munn & Co.
Attys.

M. H. CHRYSLER, OF KINDERHOOK, NEW YORK.

Letters Patent No. 97,047, dated November 23, 1869; antedated November 18, 1869.

---

IMPROVEMENT IN VEGETABLE-CUTTER.

---

The Schedule referred to in these Letters Patent and making part of the same.

---

*To all whom it may concern:*

Be it known that I, M. H. CHRYSLER, of Kinderhook, in the county of Columbia, and State of New York, have invented a new and improved Vegetable-Cutter; and I do hereby declare that the following is a full, clear, and exact description thereof, which will enable others skilled in the art to make and use the same, reference being had to the accompanying drawing, forming part of this specification, in which—

Figures 1 and 2 are vertical sectional views of my improved vegetable-cutter, showing it adapted for different kinds of work.

Figure 3 is an inverted plan or bottom view of the same.

Similar letters of reference indicate corresponding parts.

This invention relates to a new apparatus for cutting potatoes, cabbage, and other vegetables or fruits into narrow slices or strips, and consists more particularly in such an arrangement of the cutting-bed, that the core of the fruit to be cut can be left uncut, or that, when no core is to be taken out, the whole fruit can be cut, as may be desired.

The body of the apparatus is an annular bed or plate, A, made of cast-iron, or other suitable material, and supported on posts, B, or other suitable supports.

A cylinder, C, is placed upon the plate A, by being fitted around a flange, a, formed on the latter, as shown.

A circular plate, D, rests with its outer part upon rollers, b b, that are arranged on the under side of the plate A, as shown.

A circular or other aperture, c, is formed through the centre of the plate D, and cutters, E E, reaching from the outer edge to the inner edge of this annular plate D, are placed into radial slots arranged through the same, as shown.

The cutting-edges of the cutters E are somewhat above the surface of the plate D.

The plate D has, on its under side, a toothed ring, d, which gears into a pinion, e, that is mounted on a crank-shaft, F, having its bearings in the supporting part of the frame.

By turning the crank of the shaft F, the plate D will be revolved, so as to carry the cutter around.

The articles to be cut are placed into the cylinder, and are, by a follower or weight, G, held down to the revolving cutters.

They are thereby shaved or cut into small slices, that fall through the slots of the plate D.

When the article to be cut is a head of cabbage, or other vegetable or fruit to be cored, it is placed, with the core in a vertical position, upon the plate D, and is, by a pointed pin, f, that projects from the weight G, fastened, so that it cannot have its core come out of its vertical position. Then, as the cutters do not reach to the centre of the plate D, the core will remain uncut, and will move down through the central aperture of the plate D.

When the fruit or vegetables to be cut are not to be cored, there is a cylindrical bar, H, fastened to the follower G, to fill the central aperture of the plate D, as in fig. 1.

The potatoes, or other articles to be cut, are then placed into the cylinder, as in fig. 2, and are then, by turning the plate D, cut, without being able to come opposite the central aperture of D.

The weight G follows the articles, and feeds them down to the cutters.

The cutters should be vertically adjustable, so that they may be resharpened and used when narrower.

Having thus described my invention,

What I claim as new, and desire to secure by Letters Patent, is—

1. The slotted annular revolving cutting-bed D, carrying the cutters E, when arranged on a vegetable-cutter, substantially as described, and constructed with a central opening, all so that the articles to be cut can be cored or not, as may be desired.

2. The weight G, carrying the pin f, when combined with the slotted annular revolving cutting-bed D, substantially as herein shown and described.

3. The cylindrical plug or bar H, when arranged in combination with the weight G, and with the slotted annular revolving cutting-bed D, substantially as herein shown and described.

M. H. CHRYSLER.

Witnesses:
E. G. HOVER,
G. W. CHRYSLER.